Feb. 26, 1935. W. S. GRAHAM 1,992,422
TRACTOR GUIDE
Filed Dec. 23, 1933
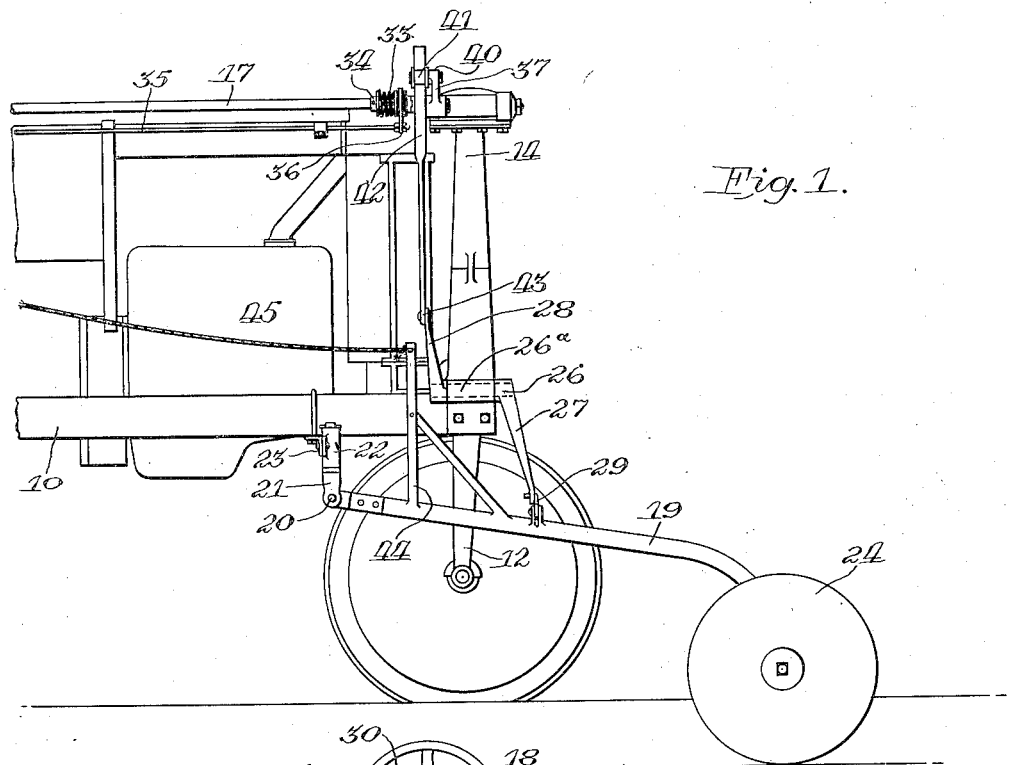
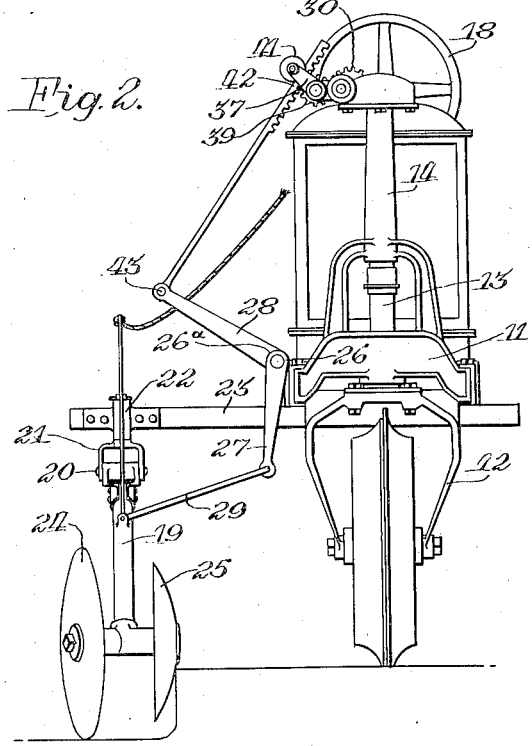
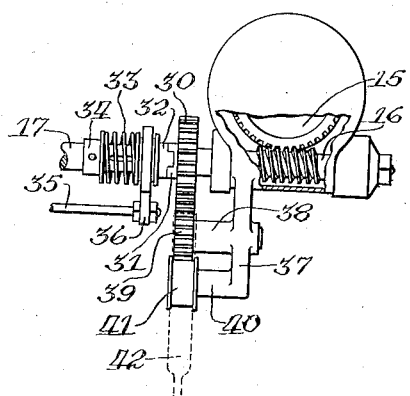
Inventor
William S. Graham Patented Feb. 26, 1935

1,992,422

UNITED STATES PATENT OFFICE 1,992,422

TRACTOR GUIDE

William S. Graham, Canton, Ill., assignor to International Harvester Company, a corporation of New Jersey Application December 23, 1933, Serial No. 703,776

9 Claims. (Cl. 97—49)

The present invention relates to automatic furrow guides for tractors.

The principal object of the invention is to provide a furrow guide for automatically steering or guiding a tractor having steering mechanism of the irreversible, or worm gear, type in which the steering movements of the furrow guide cannot be imparted directly to the steering truck or wheels of the tractor. A further object is to provide an automatic steering attachment for tractors of the type referred to which will act on the steering shaft of the tractor and be capable of connection and disconnection therefrom as desired. Further objects and advantages will become apparent from the following detailed description of the preferred embodiment of the invention as illustrated in the accompanying drawing, where:

Figure 1 is a side elevation of the front end of a tractor showing the steering mechanism thereof with the automatic guide connected thereto;

Figure 2 is a front view of the mechanism shown in Figure 1; and

Figure 3 is a detail plan view of the steering connection seen at the top of Figures 1 and 2.

In the present embodiment of the invention there is shown the forward portion of a tractor comprising a body portion 10 having a front bolster 11 supported on a steering truck 12 which has a vertical standard 13 journaled in an upright sleeve 14 mounted on the bolster. The upper end of the standard 13 has a worm wheel 15 (Fig. 3) secured thereto, which is in mesh with a worm pinion 16 fixed on the forward end of a rearwardly extending steering shaft 17. The worm wheel and pinion 15, 16 are preferably enclosed in a suitable housing, as shown. The steering shaft 17 extends rearwardly to the operator's station on the rear of the tractor where it is provided with the usual steering wheel 18.

In tractors having the steering mechanism above described, it will be seen that the connection between the steering shaft and the truck standard is practically irreversible or self-locking and therefore automatic furrow guides which have heretofore been designed to communicate steering movements directly to the steering wheel or truck, or to its standard 13, cannot be employed. This has been overcome in the furrow guide construction constituting the present invention, which will now be described.

For purposes of disclosure, the invention will be described as embodied in a plow furrow guide although it may as well be used in connection with lister cultivation.

The invention comprises a guide boom 19 pivoted on a transverse pivot 20 at its rear end carried by a swiveled fork 21 supported in a bearing sleeve 22 on the end of a transverse bar 23 secured to the tractor body just to the rear of the steering truck. The boom is thus capable of both lateral and vertical movements. The forward end of the boom carries a furrow following device, such as the disks 24 and 25, adapted to ride in and contact with the furrow wall in a manner to follow the deviations thereof. At the forward end of the tractor body and in lateral relation to the boom 19, there is pivotally mounted a bell crank lever 26. This lever is mounted in a bearing sleeve 26ª extending longitudinally of the tractor and is positioned to provide a depending arm 27 and an upwardly and laterally projecting arm 28. The arm 27 is pivotally connected to an intermediate point on the boom 19 by a link 29, and lateral movements of the boom will thus cause angular movements of the lever. The forward end of the steering shaft 17, adjacent the housing of the worm pinion 16, has journaled thereon a spur gear 30 formed on its rear side with a clutch face or collar 31. This clutch collar is adapted to inter-engage with a clutch sleeve 32 which is splined on the shaft 17 and normally pressed into engagement with the collar 31 by a spring 33 confined between the sleeve 32 and abutment collar 34 of the shaft. A shifter rod 35, connected to the clutch sleeve by shifter fork 36, extends to the rear of the tractor and provides means for connecting and disconnecting the spur gear 30 with the shaft 17 at will. Adjacent the spur pinion 30, the housing for the worm and pinion gearing 15 and 16 carries a laterally extending bracket 37, formed with a bearing sleeve 38 intermediate its ends. The sleeve carries the stub shaft of a pinion 39 which is in permanent mesh with the spur gear 30. At its outer end, the bracket 37 is formed with an angular extension 40 formed as a pintle for a guide roller 41 located in outwardly spaced relation to the pinion 39. The guide roller 41 serves to guide and retain in operative position a rack bar 42 which is in mesh with the pinion 39. The rack bar 42 is extended downwardly, as a plain rod or link, to the arm 28 of the bell crank lever, to which it is pivotally connected at 43.

In order to lift and lower the boom 19, to put it into and out of operative position, the boom is provided with a fixed upright standard 44, to the upper end of which there is connected a lifting cable 45 extending to suitable anchoring means at the rear of the tractor.

With the construction above described, it will be clear that lateral movements of the boom 19, as the guide follows deviations in the furrow, will be communicated to the lever 26, and that angular movements of this lever will cause reciprocating movements of the rack member or bar 42. Reciprocating movements of this bar will rotate the gearing comprising pinion 39 and spur gear 30. When gear 30 is clutched to the shaft 17, rotary movement in one direction or the other will be transmitted to the steering shaft 17 and therefore to the steering truck, the arrangement being such that the truck will be maintained in uniformly spaced relation to the furrow wall and the steering will therefore be entirely automatic. Moreover, by releasing gear 30, the guide can be set closer to or away from the steering wheel to compensate for tractor drift in side-hill work.

The preferred embodiment of the invention above specifically described is obviously capable of variations without departure from the scope of the invention as defined in the following claims:

I claim:

1. The combination with a tractor and the steering mechanism thereof including a rotatable steering shaft, of an automatic steering device comprising a guide boom mounted on the tractor for movement laterally and having furrow following means thereon, a lever pivoted intermediate its ends on the tractor, a link connecting one arm of said lever with the boom, gearing connected to the steering shaft, and a rack bar in mesh with said gearing and having one end pivotally connected with the second arm of said lever.

2. The combination with a tractor and the steering mechanism thereof including a rotatable steering shaft, of an automatic steering device comprising a guide boom mounted on the tractor for movement laterally and having furrow following means thereon, a bell crank lever pivoted on the tractor on an axis extending longitudinally thereof, a link connecting one arm of said lever to the boom, gearing connected to the steering shaft, a rack bar in mesh with said gearing and having one end pivotally connected with the second arm of said bell crank lever, and a guide arm adjacent said gearing for maintaining the rack bar in operative relation to the gearing.

3. The combination with a tractor and the steering mechanism thereof including a rotatable steering shaft, of an automatic steering device comprising a guide boom mounted on the tractor for movement laterally and having furrow following means thereon, a lever pivoted intermediate its ends on the tractor, a link connecting one arm of said lever with the boom, a spur gear rotatably mounted on the steering shaft and formed with a clutch collar, a clutch sleeve splined on the shaft and movable into and out of engagement with the clutch collar on the spur gear, a bracket mounted adjacent the spur gear, a pinion carried by said bracket in mesh with the spur gear, a rack bar in mesh with said pinion and having one end pivotally connected with the second arm of said lever, and guide means on the bracket for maintaining the rack bar in operative relation to the pinion.

4. The combination with a tractor and the steering mechanism thereof including a rotatable steering shaft, of an automatic steering device comprising a guide boom mounted on the tractor for movement laterally and having furrow following means thereon, a lever pivoted intermediate its ends on the tractor, a link connecting one arm of said lever with the boom, a spur gear rotatably mounted on the steering shaft and formed with a clutch collar, a clutch sleeve splined on said steering shaft, adjustable means for moving said sleeve into and out of engagement with the clutch collar on the spur gear, a bracket mounted adjacent the spur gear, a pinion carried by said bracket in mesh with the spur gear, a rack bar in mesh with said pinion and having one end pivotally connected with the second arm of said lever, and guide means on the bracket for maintaining the rack bar in operative relation to the pinion.

5. The combination with a tractor and the steering mechanism thereof including a rotatable steering shaft, of an automatic steering device comprising a guide boom mounted on the tractor for movement laterally and having furrow following means thereon, a lever pivoted intermediate its ends on the tractor, a link connecting one arm of said lever with the boom, a spur gear rotatably mounted on the steering shaft and formed with a clutch collar, a clutch sleeve splined on said steering shaft, adjustable means for moving said sleeve into and out of engagement with the clutch collar on the spur gear, resilient means mounted on said steering shaft whereby said clutch sleeve is engaged with said spur gear upon release of said adjustable means, a pinion carried by said bracket in mesh with the spur gear, a rack bar in mesh with said pinion and having one end pivotally connected with the second arm of said lever, and guide means on the bracket for maintaining the rack bar in operative relation to the pinion.

6. The combination with a tractor and the steering mechanism thereof including a rotatable steering shaft, of an automatic steering device comprising a guide boom mounted on the tractor for movement laterally and having furrow following means thereon, pivoted means for mounting said guide boom whereby said guide boom may be raised and lowered in a vertical plane, a lever pivoted intermediate its ends on the tractor, a link connecting one arm of said lever with the boom, gearing connected to the steering shaft, and a rack bar in mesh with said gearing and having one end pivotally connected with the second arm of said lever.

7. The combination with a tractor and the steering mechanism thereof including a rotatable steering shaft, of an automatic steering device comprising a guide boom mounted on the tractor for movement laterally and having furrow following means thereon, pivoted means for mounting said guide boom whereby said guide boom may be raised and lowered in a vertical plane, a lever pivoted intermediate its ends on the tractor, a link connecting one arm of said lever with the boom, gearing connected to the steering shaft, a rack bar in mesh with said gearing and having one end pivotally connected with the second arm of said lever, and clutch means whereby said gearing may be released from said steering shaft whereby said guide boom may be raised and lowered in a vertical position.

8. An automatic steering attachment for tractors having a wheeled frame and a steering shaft, said attachment comprising a frame member and a pivoted guide boom having lateral movement, means for detachably connecting said frame member across the forward end of a tractor, oscillating means mounted on said steering shaft, clutch means mounted on said steering shaft whereby said guide attachment may be engaged or disengaged from said oscillating means, means mounted on said tractor for connecting said steering guide boom to said tractor steering shaft, and pivoting means whereby said guide boom may be raised or lowered.

9. An automatic steering attachment for tractors having a wheeled frame and a steering shaft, said attachment comprising a frame member and a pivoted guide boom having lateral movement, means for detachably connecting said frame member across the forward end of a tractor, oscillating means mounted on said steering shaft, clutch means mounted on said steering shaft whereby said guide attachment may be engaged or disengaged from said oscillating means, pivoted bell crank means mounted on said tractor, link means connecting said pivoted boom and said bell crank, pivoted operating means connecting said bell crank and said oscillating means, and pivoting means on said frame member whereby said guide boom may be raised or lowered.

WILLIAM S. GRAHAM.